Dec. 14, 1926.  
T. J. BENSON  
1,610,238  
CUSHION TIRE  
Filed Oct. 13, 1924
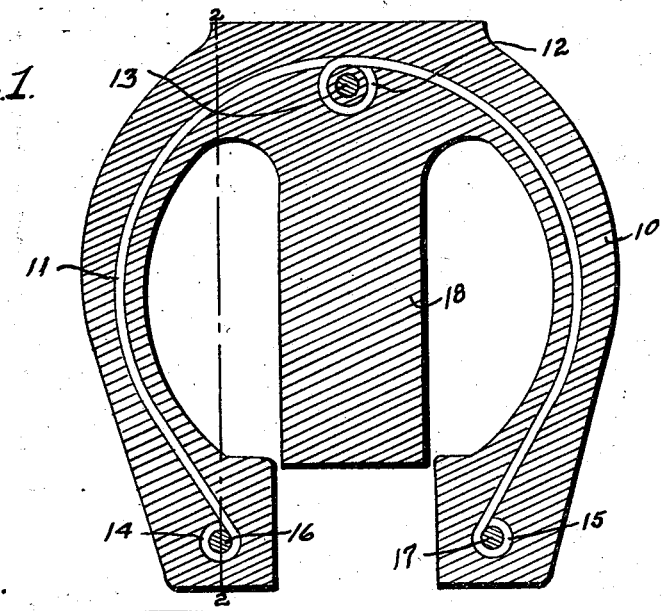
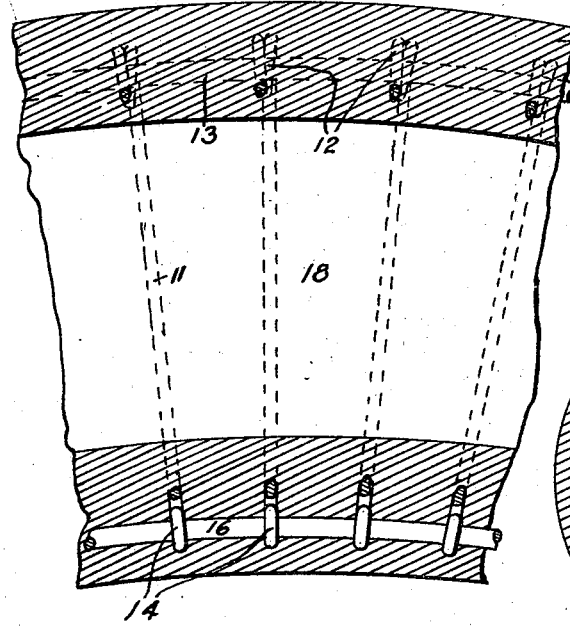
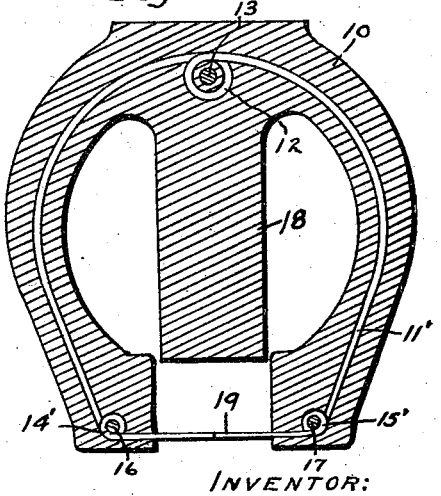
INVENTOR:  
T. J. BENSON  
By Earl M. Sinclair  
Atty.

Patented Dec. 14, 1926.

1,610,238

UNITED STATES PATENT OFFICE.

THOMAS J. BENSON, OF MELCHER, IOWA.

CUSHION TIRE.

Application filed October 13, 1924. Serial No. 743,277.

The primary object of this invention is to provide an improved cushion tire for vehicles to supplant the common pneumatic tires and do away with the troubles incident to their use.

A further object of this invention is to provide an efficient cushion tire having a rubber and fabric or cord casing and a series of spring elements embedded therein and spaced circumferentially of the tire.

A further object of this invention is to provide an improved cushion tire having a casing and a series of spring elements embedded therein in spaced relation, the casing being provided with a shock-absorbing element adapted to limit movement of the tread portion toward the wheel rim, thus preventing undue strain on the spring elements.

A further object of this invention is to provide an improved cushion tire having a series of spring elements embedded in a casing, the spring elements being connected circumferentially and transversely near the rim portion to assist in holding the members in proper place.

With these and other objects in view, my invention consists in the construction, arrangement and combination of elements hereinafter set forth, pointed out in the claims and illustrated by the accompanying drawing, in which—

Figure 1 is a cross-section of a cushion tire embodying my improvements.

Figure 2 is a section on the line 2—2 of Figure 1.

Figure 3 is a cross-section, on a smaller scale, showing a somewhat modified form of tire.

In the construction of the device as shown the numeral 10 designates generally a casing, which may be constructed according to present methods, of rubber, rubber and fabric, cords or the like in any suitable manner. The casing may vary in size, form and type to fit particular needs or desires, and I do not wish to be understood as limiting myself to the specific form or construction herein shown, except as indicated by the scope of the claims. Any suitable means may be provided for the holding of the casing on a wheel rim of any suitable type, not shown.

A series of spring elements are provided, indicated generally by the numeral 11, each preferably formed of spring wire and bent to conform in general to the cross-sectional shape of the casing 10, or substantially "horse-shoe" form. The spring elements 11 are molded and embedded in the casing 10 and preferably do not protrude therefrom at any point but are entirely hidden and covered thereby, said spring elements being suitably spaced circumferentially of the casing as indicated in Figure 2. In its central portion, adjacent the tread of the tire, each spring element is formed with a circular loop or eye 12, integrally formed by bending the spring wire of which the element is made. An annular spring 13, in this instance a rod or heavy wire, extends circumferentially of the tread portion of the casing and passes through the loops 12 of all of the spring elements 11.

At their respective ends, which are located adjacent the rim portion of the casing, the spring elements 11 are formed with integral eyes 14, 15, and through the eyes of said spring elements are passed wires 16, 17 respectively, extending circumferentially of the casing. These wires 16, 17 need not be of spring material, but are similar to the wires ordinarily embedded in the rim portions of casings of common form, to assist in holding the casing in proper shape and position.

In practical use, the casing 10 is held in nearly normal position, and resiliency is provided, by the series of spring elements 11 and the annular spring 13, the load being borne successively by one or more spring elements circumferentially of the tire as it revolves. As is common with other tires, the casing and with it the spring elements may yield laterally to greater or less extent, depending upon the amount of the load and the excess pressure applied at times by jolts and shocks occasioned by bumps, obstructions or unevenness in the road surface.

I have deemed it desirable to provide within the casing 10 an integral shock-absorbing element such as 18, which is of substantially rectangular form in cross-section and extends from the tread portion of the casing toward the rim, with its greater transverse dimension arranged radially of the tire. This shock-absorbing element is of somewhat less width than the spacing of the base portions of the casing, between which it may pass at times when the tire is compressed or flattened. The function of this member is to contact at its inner margin with the rim on which the tire is mounted, and limit flattening of the casing under extreme pressure such as might be caused by striking an unusual obstruction. The shock-absorbing element 18, in common with the body of the casing, has some inherent resilience and absorbs some of the shock, but its primary function is to take strain of such an emergency from the spring elements 11 and prevent their breaking by being bent too far laterally.

In Figure 3 I have shown the spring elements 11' extended at their inner ends beyond the eyes 14', 15', to form a tine member 19 rigidly connecting the eyes 14', 15', and the inner ends of the spring element 11'. The tie member 19 may be formed by welding together the extended portions at the respective ends of the spring element, and its function is to assist in holding the base portions of the tire in proper position, and to prevent either spreading of such portions or movement thereof toward each other, when the tire is compressed or flattened. Thus they serve to maintain the space between the base portions of the tire for the entrance of the shock-absorber element 18.

I claim as my invention—

1. A cushion tire, comprising a resilient casing, a plurality of spring elements spaced apart circumferentially of and embedded in said casing, each of said elements being of substantially U-form and including an integral loop in its central portion, and an annular spring member extending circumferentially of and embedded in said casing, said annular spring member extending through the loops of the respective spring elements, but not connected directly with said elements.

2. A cushion tire, comprising a resilient casing, a plurality of spring elements spaced apart circumferentially of and embedded in said casing, each of said elements being of substantially U-form and having an integral loop in its central portion and an integral eye at each end, together with annular members extending through the loop and eyes of all the spring elements, said spring elements being extended beyond the eyes and forming a rigid tie rod arranged transversely of the base portion of the casing.

3. A cushion tire, comprising a resilient casing of substantially U-form, a plurality of spring elements of substantially U-form embedded in said casing, said casing being formed with a circumferential shock-absorbing element substantially rectangular in cross-section extending from the inner side of its tread portion substantially diametrically of the casing and adapted at times to extend between the base portions of the casing and spring elements to limit lateral flattening thereof.

4. A cushion tire, comprising a resilient casing of substantially U-form, a plurality of spring elements of substantially U-form embedded in said casing, said spring elements being formed with extensions projecting from their ends and united to form a tie rod extending tranversely of the base portion of the casing, said casing being formed with a shock-absorbing element extending from the inner side of its tread portion subtantially to and adapted to project between the members at the base portion of said casing at times.

Signed at Melcher, in the county of Marion and State of Iowa, this 29th day of September, 1924.

THOMAS J. BENSON.